Dec. 9, 1969  J. W. PUTT ET AL  3,482,617
ANTI-SKID DEVICE FOR VEHICLES
Filed Nov. 29, 1967  7 Sheets-Sheet 1
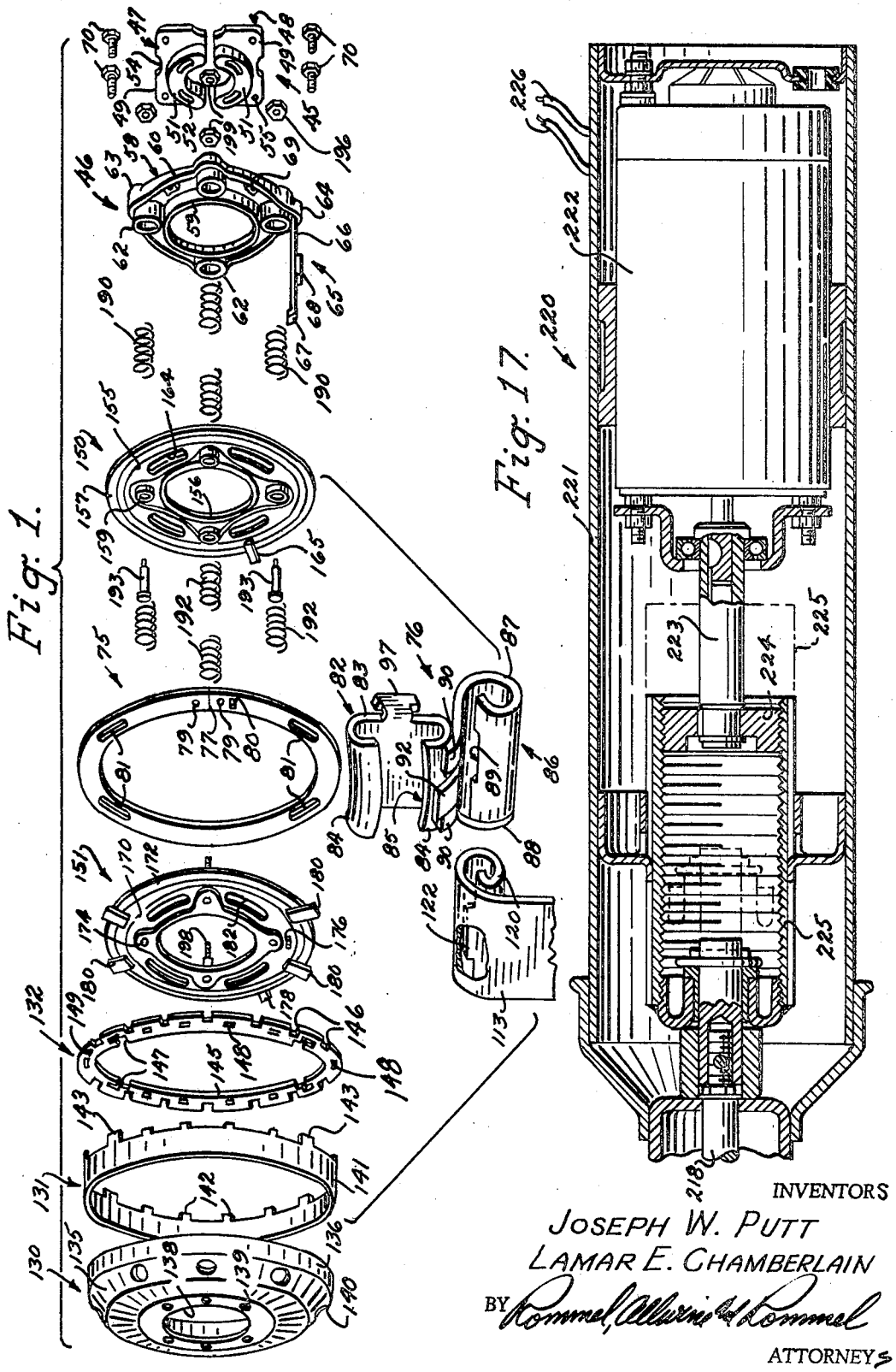
INVENTORS
JOSEPH W. PUTT
LAMAR E. CHAMBERLAIN
BY *Rommel, Allwine & Rommel*
ATTORNEYS

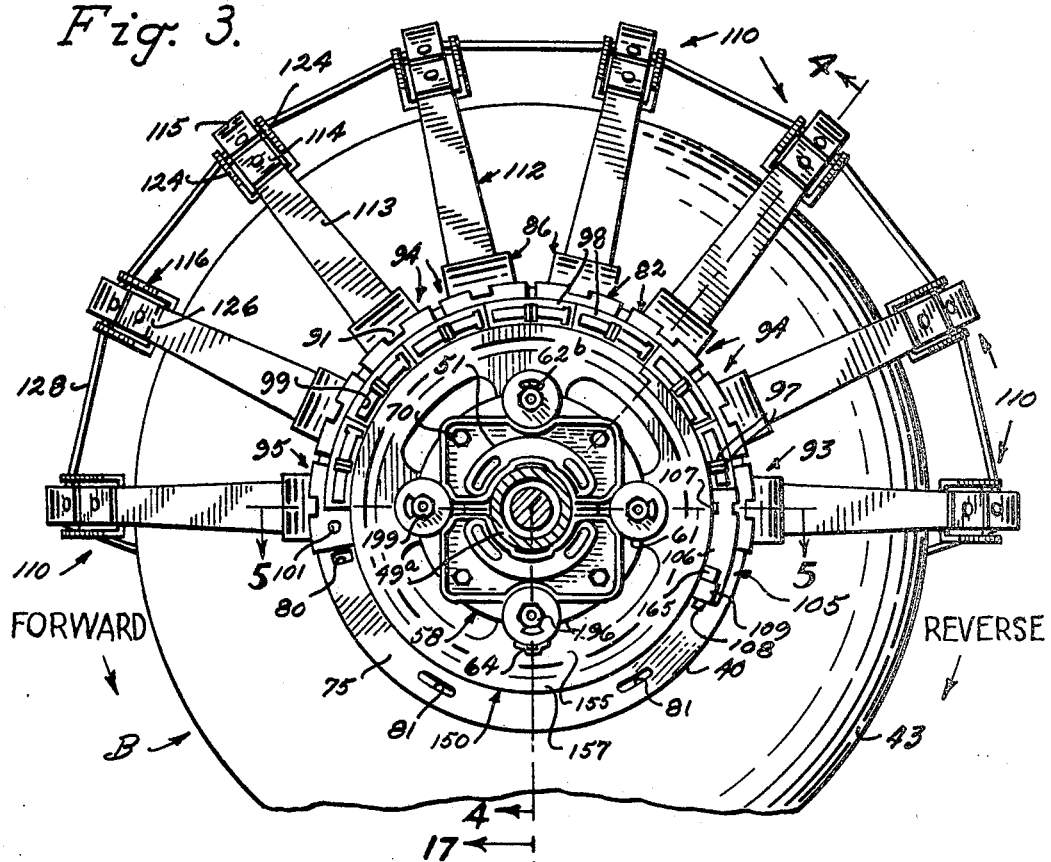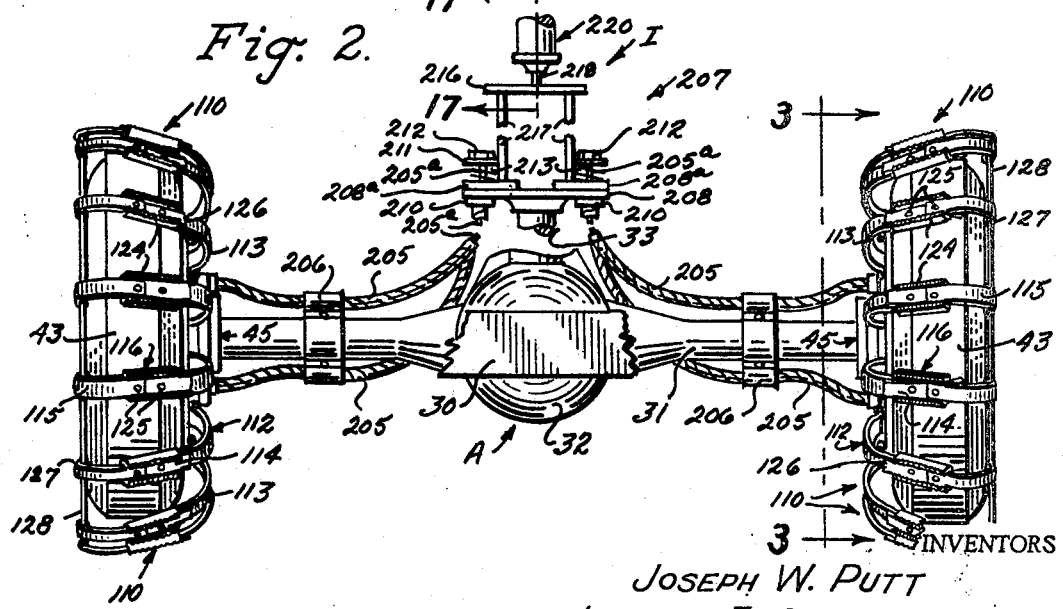

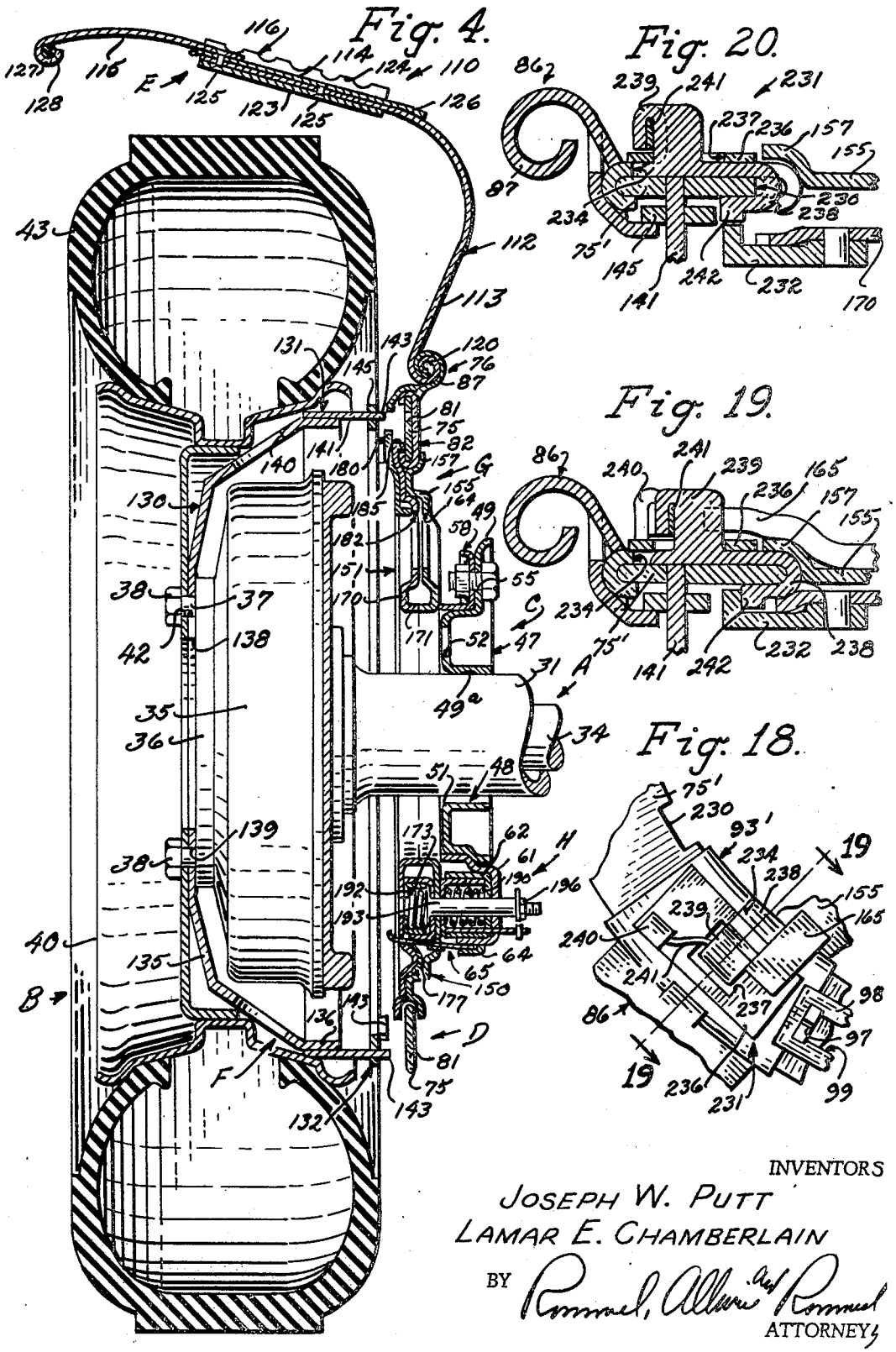

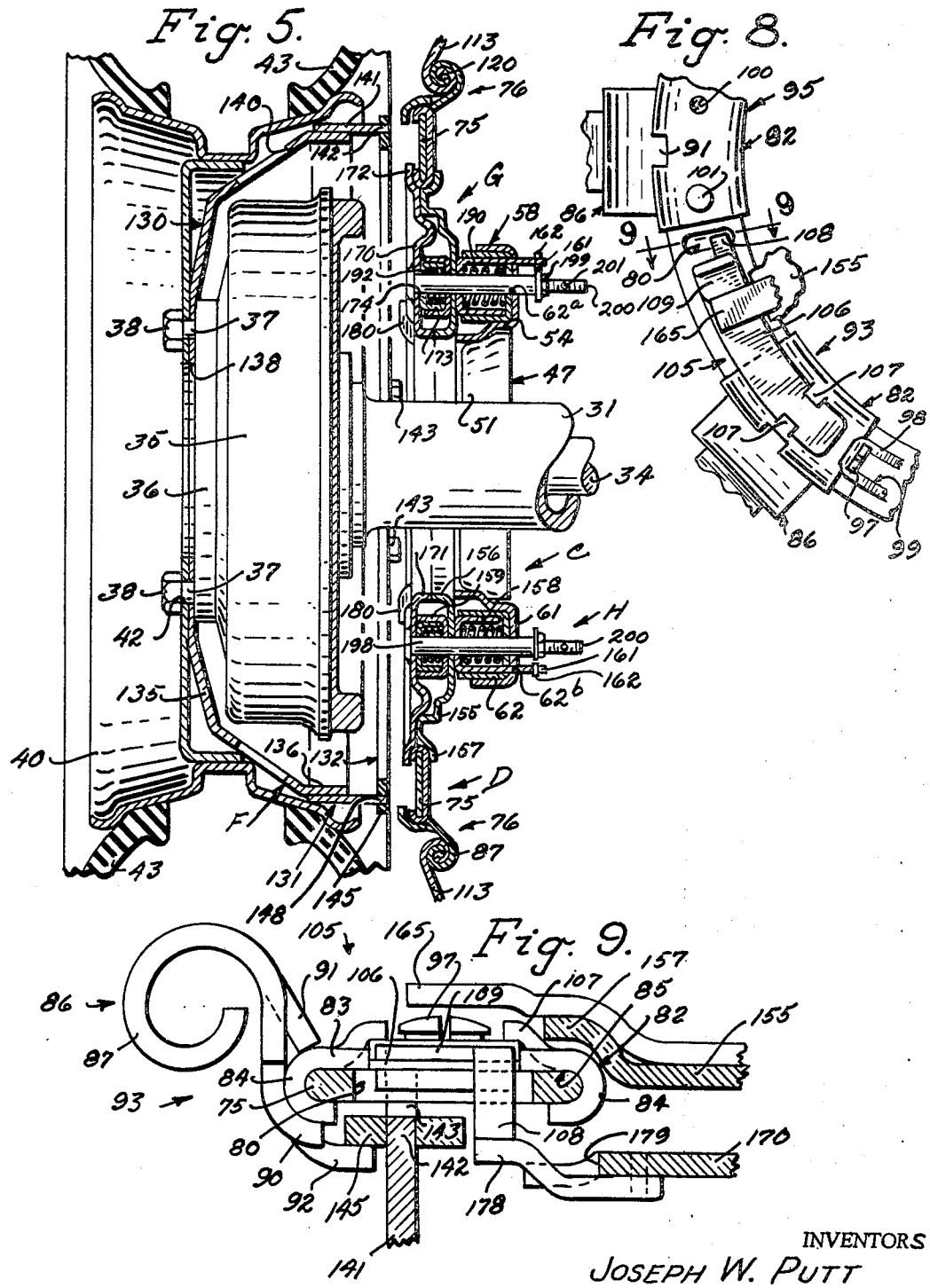

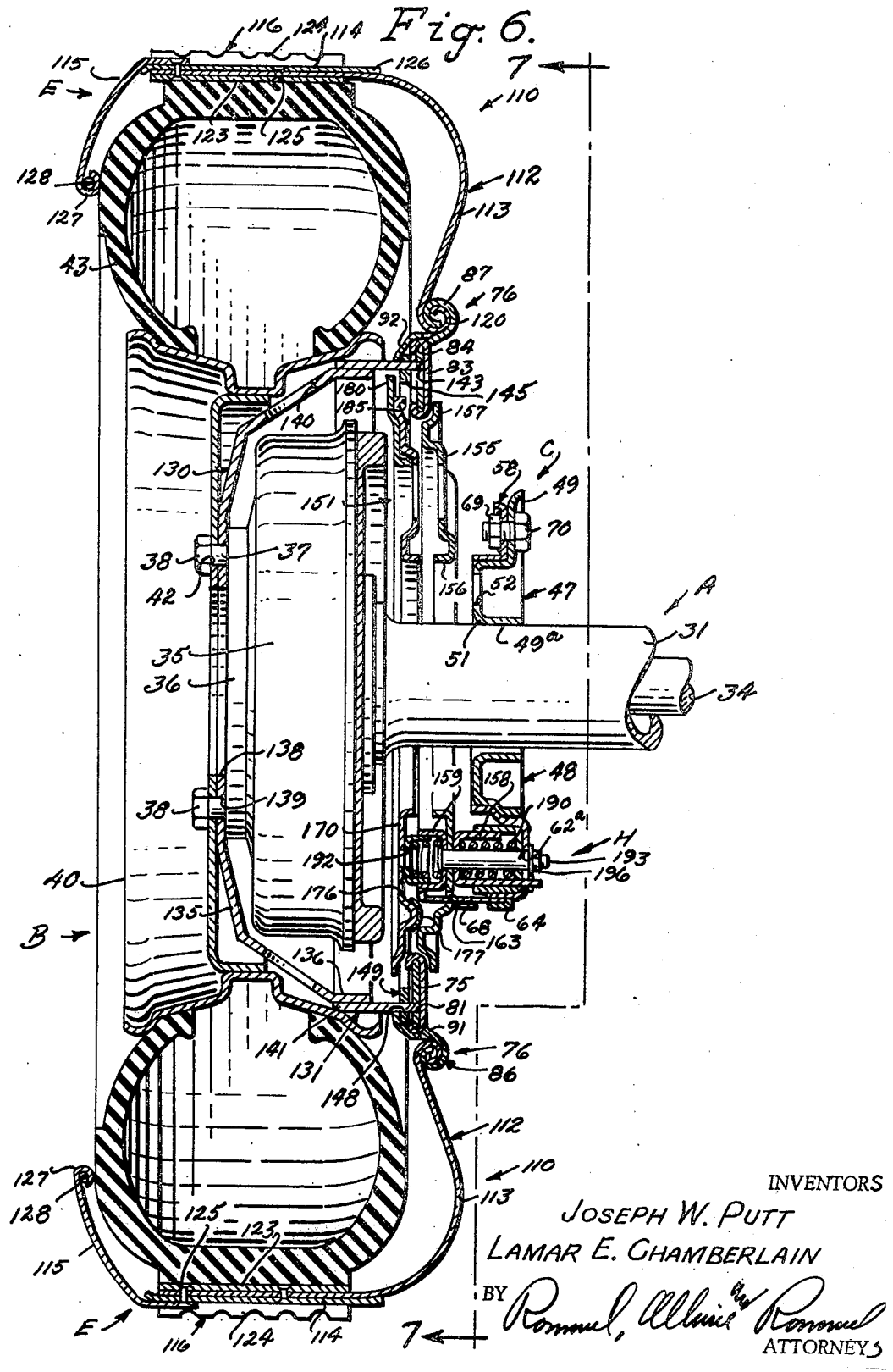

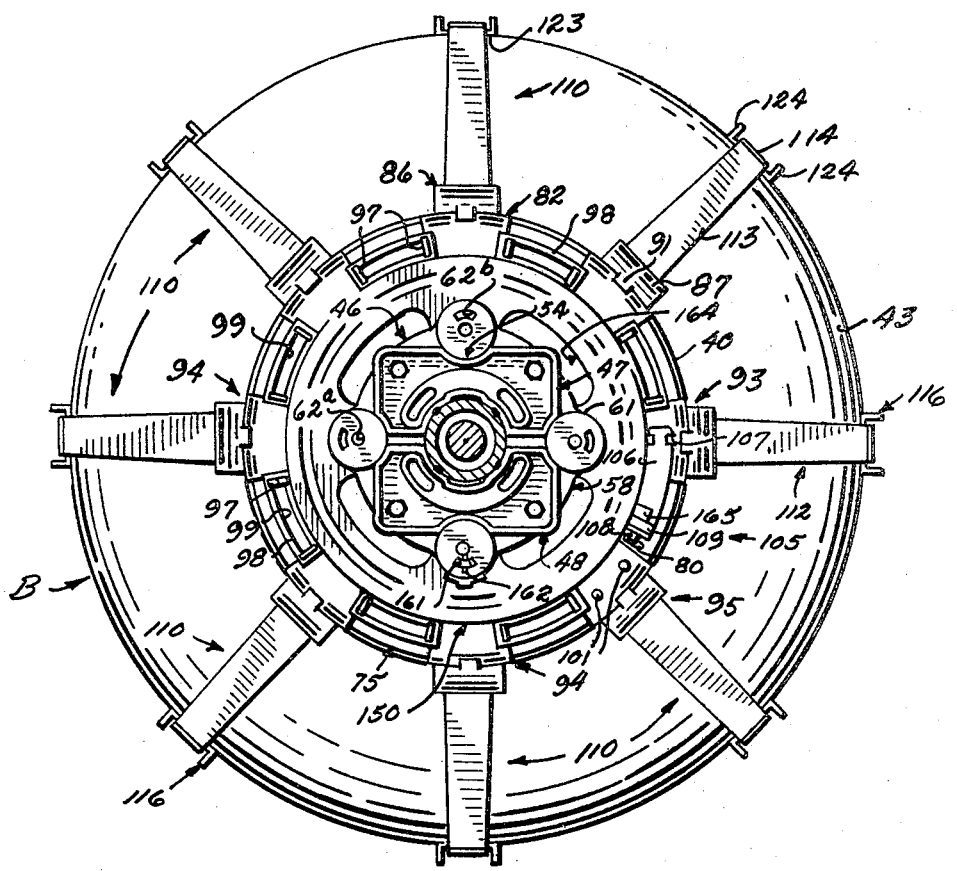
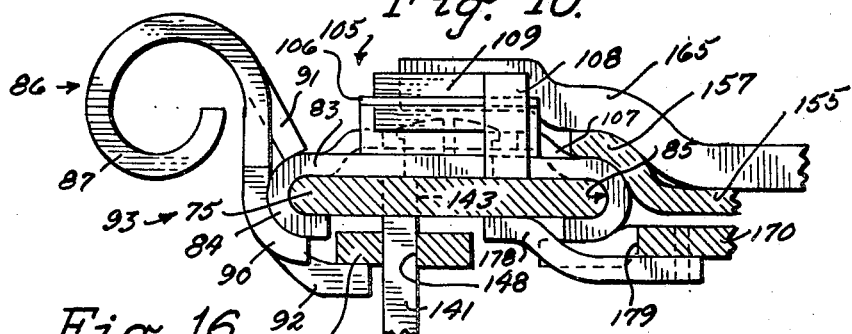
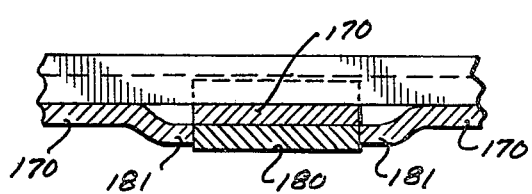

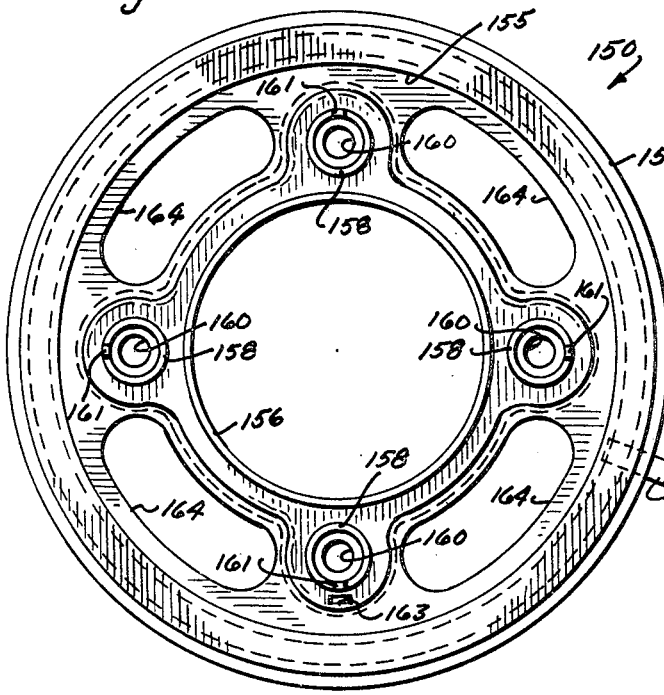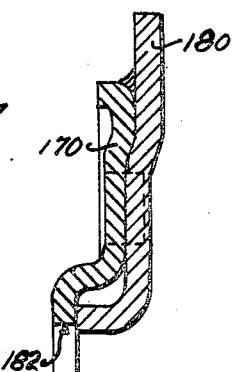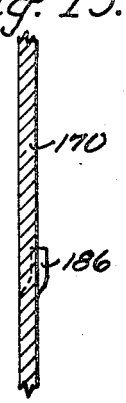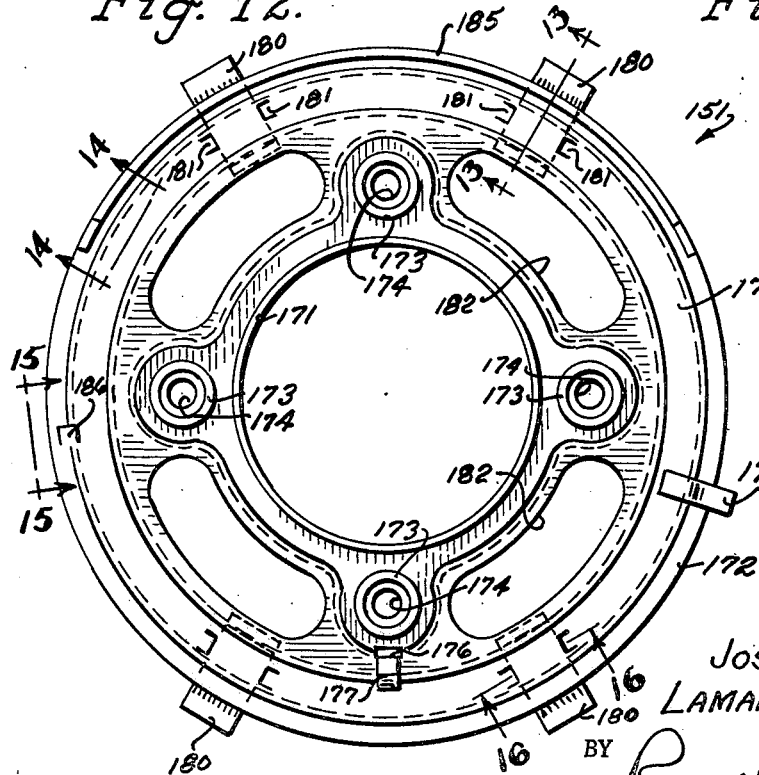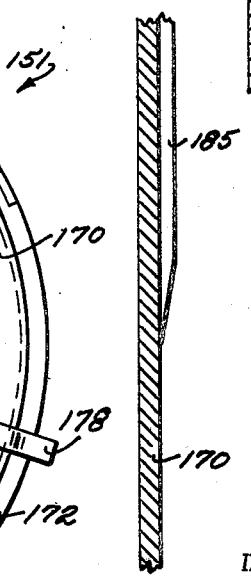
INVENTORS
JOSEPH W. PUTT
LAMAR E. CHAMBERLAIN
ATTORNEYS United States Patent Office  3,482,617
Patented Dec. 9, 1969

3,482,617
ANTI-SKID DEVICE FOR VEHICLES
Joseph W. Putt, Forty Fort, Pa., and Lamar E. Chamberlain, Washington, D.C., assignors to Non-Skid, Inc., Harrisburg, Pa., a corporation of Pennsylvania
Filed Nov. 29, 1967, Ser. No. 686,486
Int. Cl. B60c 27/02
U.S. Cl. 152—214                              19 Claims

ABSTRACT OF THE DISCLOSURE

A vehicle wheel traction device which includes a plurality of anti-skid elements, and means operably interconnected for collection of the anti-skid elements adjacent the uppermost portion of the vehicle wheel in a relatively stationary position in the disengaged position of the traction device and for spacing of the anti-skid elements about the vehicle wheel and rotation of the anti-skid elements with the wheel in the engaged position of the traction device.

DISCLOSURE

This invention relates to anti-skid devices for association with the ground engaging wheels of motor vehicles and trailers.

We are aware of the fact that a number of devices have been proposed for applying anti-skid elements to engage the peripheries of and rotate with vehicle wheels. We are jointly the patentees of U.S. Patent No. 2,897,868, dated Aug. 4, 1959, and Lamar E. Chamberlain is the patentee of U.S. Patent No. 2,720,237, dated Oct. 11, 1955. The above noted patents have contributed materially to advancing the art in connection with traction devices for vehicle wheels, and the present invention is a further advance in this art.

The primary object of the invention is to proivde a vehicle wheel traction device having a disengaged position in which the anti-skid elements thereof are out of contact with the vehicle wheel and remain collected in a relatively stationary position adjacent the uppermost portion of the wheel, and which may be actuated to an engaged position with the anti-skid elements spaced about the vehicle wheel and rotating with the vehicle wheel in ground engaging position. The traction device may be operated from controls which may be located in the driver's or passenger's compartment of the vehicle. The traction device may thus be brought into the engaged position when needed on slippery roads and may be actuated to a disengaged position when the slippery condition clears up. The device is equally applicable for use in connection with passenger vehicles and trucks, being used primarily for the drive wheels thereof, and may be likewise applied to trailers, providing greater safety for the trailers, rendering the brakes of the trailer more efficient on slippery highways, to counteract the momentum of the trailer in avoidance of any jack-knifing of the trailer when the same is brought to a stop on a slippery highway.

A further object of the invention is the provision of a vehicle wheel traction device having actuating means which cooperates with rotation of the wheel in moving of the same to the engaged and disengaged positions thereof, eliminating the necessity for use of any sort of drive motors or other apparatus for distribution and spacing of the anti-skid elements about the wheel or collection together of the same adjacent the uppermost portion of the wheel.

Other objects and advantages of the invention will be apparent during the course of the following detailed description, taken in connection with the accompanying drawings, forming a portion of this specification, and in which drawings:

FIG. 1 is an exploded perspective view showing the basic relation of various parts of the invention.

FIG. 2 is a top plan view showing the traction devices applied about vehicle wheels.

FIG. 3 is an enlarged view taken from the inside of a vehicle wheel substantially on the line 3—3 of FIG. 2.

FIG. 4 is an enlarged sectional view taken substantially on the line 4—4 of FIG. 3.

FIG. 5 is an enlarged sectional view taken substantially on the line 5—5 of FIG. 3.

FIG. 6 is a view similar to FIG. 4, but showing the traction device in its engaged position.

FIG. 7 is a view taken from the inside of the vehicle wheel, substantially on the line 7—7 of FIG. 6.

FIG. 8 is an enlarged fragment of the latch and latching segment of FIG. 7.

FIG. 9 is an enlarged sectional view taken substantially on the line 9—9 of FIG. 8.

FIG. 10 is a view similar to FIG. 9, but showing parts thereof in an unlatched position.

FIG. 11 is a plan view of the inside disc of the invention.

FIG. 12 is a plan view of the outside disc of the invention.

FIG. 13 is an enlarged sectional view taken substantially on the line 13—13 of FIG. 12.

FIG. 14 is an enlarged sectional view taken substantially on the line 14—14 of FIG. 12.

FIG. 15 is an enlarged fragmentary sectional view taken substantially on the line 15—15 of FIG. 12.

FIG. 16 is an enlarged fragmentary sectional view taken substantially on the line 16—16 of FIG. 12.

FIG. 17 is an enlarged sectional view taken substantially on the line 17—17 of FIG. 2.

FIG. 18 is a fragmentary view similar to FIG. 8, but showing a modified form of latching device.

FIG. 19 is an enlarged sectional view taken substantially on the line 19—19 of FIG. 18.

FIG. 20 is an enlarged sectional view similar to FIG. 19, but showing the latch thereof in a latched position.

In the drawings, wherein for the purposes of illustration are shown a preferred and modified embodiment of the invention, and wherein similar reference characters designate corresponding parts throughout the several views, the letter A may generally designate a vehicle assembly which includes vehicle wheels B; C mounting means for the traction device; D support means for a plurality of anti-skid means E; F power transfer means for transfer of rotational torque from a vehicle wheel B to support means D; G means supported on mounting means C for releasably maintaining support means D in disconnection from cooperation with power transfer means F; H actuating means for operation of the traction device; and I control means for actuating means H.

Vehicle assembly A may be of any conventional type. About the only requirement for the same is that it have a rotating vehicle wheel, a supporting frame which is adjacent to the vehicle wheel and is not rotatable with the wheel, and sufficient space for operably mounting of the traction device. Vehicle assembly A, as shown in FIG. 2, comprises a top plan view of the rear drive wheels of a truck. This showing is for illustration of an operable use of the traction device and it is to be understood that the invention is not limited to use in connection with drive wheels of trucks, the same being equally applicable to many other types of vehicle wheels, whether drive or otherwise.

As shown, conventional vehicle assembly A includes a vehicle frame 30 which may be interconnected with and supported upon an axle housing 31; a differential housing 32; drive shaft housing 33; an axle 34 rotatably received within axle housing 31; brake drums 35; and conventional mounting plates 36 having lugs 37 which receive nuts 38 in securing of the wheels to the vehicle. In this showing of the vehicle assembly, axle housing 31 provides the non-rotative frame adjacent the wheels for receiving mounting means C.

Vehicle wheels B are of conventional construction, each including a hub 40 which has a plurality of spaced apertures 42 for attachment of the hub to the vehicle on lugs 37 by nuts 38. A tire 43 may be supported peripherally about hub 40 in the usual manner.

Referring to FIG. 2, the traction device which is applied to the right-hand vehicle wheel B has an arrangement of parts which is slightly different from that applied to the left-hand vehicle wheel B. In this disclosure, we mainly show and describe right-hand vehicle wheel B. Following the description with respect to right-hand vehicle wheel B, we will describe the arrangement of parts necessary for use of the device for left-hand vehicle wheel B.

Mounting means C preferably includes an axle bracket 45 and a carrier flange 46.

Axle bracket 45 preferably comprises a split bracket including bracket halves 47 and 48. Bracket halves 47 and 48 are designed for interfitting about an axle housing 31 and may be secured thereto such as by spot welds 49a.

Bracket halves 47 and 48 each preferably include a plate portion 49 having a raised flange portion 51 adjacent one side thereof. Flange portion 51 may be provided with a plurality of slots 52 and plate portion 49 may be provided with outer semi-circular cut-outs 54 and bolt receiving apertures 55.

Carrier flange 46 preferably includes a substantially circular body portion 58 having an inner circular flange portion 59 and an outer flange portion 60. Body portion 58 is preferably shaped to provide spaced circular portions 61 which may each receive a spring cup 62. Such shaping may provide a plurality of arcuate projections 63 about the periphery of flange portion 60. An aperture 62a may be provided through body portion 58 and spring cup 62, axially extending through spring cup 62, and a slot 62b adjacent aperture 62a, for a purpose to be subsequently described. To one arcuate projection 63 may be attached a latch spring retainer bracket 64. An elongated latch spring 65, including a leaf spring member 66 having a turned end portion 67 and a stop 68 intermediate the length thereof may be attached to latch spring retainer bracket 64. Nuts 69 may be welded to one side of body portion 58.

Axle bracket 45 is preferably attached to axle housing 31 in such a manner that the raised flange portion 51 of bracket halves 47 and 48 are positioned to form a substantially circular flange that may be received within inner flange portion 59 of carrier flange 46. Spaced circular portions 61 of carrier flange 46 are preferably positioned so that an arcuate portion thereof is received within a semi-circular cut-out 54 of axle bracket 45, maintaining carrier flange 46 against any rotation with respect to axle bracket 45. Bolts 70 may be attached through apertures 55 of axle bracket 45 and received within nuts 69 of carrier flange 46 for attachment of carrier flange 46 to axle bracket 45. Slots 52 of axle bracket 45 are provided for clearance of hydraulic lines to the vehicle wheel brakes or for receiving therethrough any other connections which it may be necessary to have lead to adjacent the vehicle wheel.

Support means D preferably comprises a segment means which includes a segment ring 75 upon which are mounted a plurality of segments 76.

Segment ring 75 preferably has a split 77 at one side thereof, forming a split ring member which may be parted for interfitting of segments 76 thereon, as will be subsequently described. A pair of rivet attaching apertures 79 may be provided to each side of split 77 for attachment of a segment 76 to segment ring 75, as will be subsequently described. A slot 80 may be provided adjacent split 77, which cooperates with a certain one of the segments 76, as will be subsequently described. A plurality of elongated slots 81 may be provided about segment ring 75, for a purpose as will be subsequently described.

Each segment 76 preferably includes a somewhat C-shaped main body portion 82 comprising a central portion 83 and turned in side portions 84, defining a socket 85 for receiving segment ring 75 in the mounting of segments 76 on segment ring 75.

Each segment 76 also preferably includes a mounting portion 86 for attachment of an anti-skid means E thereto. Each mounting portion 86 preferably comprises a spiral member 87, the same being open at one side thereof and having a cover 88 at the other side thereof, one end of spiral member 87 having a notch 89 and an anti-skid means E is mounted on spiral member 87 as will be subsequently described.

The end of spiral member 87 opposite the end thereof having notch 89 may be provided with fingers 90 and a projection 91 adjacent thereto. Mounting portion 87 is preferably attached, by spot welding or otherwise, to a turned in side portion 84 with fingers 90 engageable along and extending to one side thereof and projection 91 abutting the other side thereof. A guide projection 92 extends from between fingers 90, being spaced outwardly from C-shaped main body portion 82 and partly over the opening of the C-shaped thereof. The cooperation of guide projection 92 with other elements of the traction device will be subsequently described.

There are preferably provided three different types of segments 76, namely, a latching segment 93, a plurality of intermediate segments 94, and a solid segment 95.

In mounting of segments 76 on segment ring 75, segment 75 is parted at split 77, latching segment 93 is mounted thereon by interfitting segment ring 75 within socket 85 thereof, and the same slid about segment ring 75 in a clockwise direction; intermediate segments 94 are next mounted thereon by successively interfitting segment ring 75 within sockets 85 thereof, one after the other, and the same are slid in a clockwise direction about segment ring 75; and solid segment 95 is last mounted thereon by interfitting segment ring 75 within socket 85 thereof.

Each of the segments is provided with a connector lug 97 adjacent the next nearest segment, and connecting links 98 are provided for operable atachment of the segments to each other. Connecting links 98 each include an elongated slotted portion 99 through which the lugs 97 of adjacent segments may move, so that the segments may be grouped closely together, as shown in FIG. 3, or spread apart, as shown in FIG. 2.

Solid segment 95 is preferably provided with a pair of apertures 100 which mate with apertures 79 of split ring 75 and which may receive rivets 101 in attaching solid segment 95 in a fixed position across split 77 of segment ring 75, making segment ring 75 a solid member. This attachment of solid segment 95 to segment ring 75 also provides for rotation of solid segment 95 with segment ring 75, as will be subsequently described.

Latching segment 93 has latching means 105 mounted thereon.

Latching means 105 preferably includes an elongated leaf spring member 106 which, at one end thereof, may be attached to central portion 83 of main body portion 82 thereof such as by a pair of latch tabs 107 which extend from central portion 83. Elongated spring member 106 extends from interconnection with locking segment 93 in a direction away from the intermediate segments 94 next adjacent thereto, and the outermost end is provided with a depending lug 108 which when the traction device is in the position as shown in FIGS. 4 and 10, abut against one surface of segment ring 75 and, when the traction device is in the position as shown in FIGS. 6, 8 and 9, interfits within slot 80 of segment ring 75, slot 80 thus providing a keeper means for latching cooperation with latching means 105. The uppermost surface of spring 106 is provided with a raised projection 109, for a purpose as will be subsequently described. Elongated leaf spring member 106 urges lug 108 against segment ring 75, for latching cooperation with the keeper means provided by slot 80, the same being latched and unlatched in a manner as will be subsequently described.

Anti-skid means F preferably comprises a plurality of anti-skid elements 110, an anti-skid element 110 being attached to each segment 76.

Each anti-skid element 110 preferably includes traction strap means 112 which may comprise an elongated strap 113 of spring steel, a heel member 114, a toe member 115, and a cleat 116.

Strap 113 is provided at one end thereof with a spiral 120 which interfits within spiral member 87 of mounting portion 86. The end spiral of strap 113 is provided with a flange portion 122 which is received by notch 89 of mounting portion 86, with one side thereof abutting against cover 88 of mounting portion 86. Traction strap means 112 may thus be securely attached to a mounting portion 86 of each segment 76. It should be noted that such attachment is in a manner to permit some flexure of the same with respect to the segment 76 to which the same is attached when traction strap means 112 is in a position about vehicle wheel B for engagement with the ground.

Strap 113 extends in a somewhat L-shaped manner from mounting portion 86 of segment 76 into position for attachment about vehicle wheel B. To the outermost end of strap 113, at the side thereof away from vehicle wheel B, is attached heel member 114, toe member 115 and cleat 116. Cleat 116 preferably comprises an elongated substantially U-shaped member having an elongated base plate 123 and upstanding ground engaging flange ends 124 at each side thereof. Strap 113, heel member 114 and toe member 115 interfit across base plate 123 and are attached together as a single unit by rivets 125.

Heel member 114 is of relatively wear resistant material and has a portion 126 which extends away from cleat 116 toward the end of strap 113 which is attached to a segment 76, over a portion of strap 113. This projecting portion 126 strengthens attachment of strap 113 at the rivet points and also protects strap 113 from undue bending and possible abrasion against the ground when the traction device is in its engaged position.

Toe member 115 is preferably of light spring steel and extends toward the outer side of vehicle wheel B. The outermost end of toe member 115 is provided with a loop portion 127 which may receive an elastic member 128. Upon spacing of the anti-skid elements 112 about vehicle wheel B, elastic member 128 will be stretched, drawing the anti-skid element 112 tightly about the outer periphery of vehicle wheel B, as can be seen in FIG. 6. This prevents any flapping of the anti-skid element and provides for secure placement of the same about the tire. Elastic member 128 also serves to hold the anti-skid element in the event that the same should break, permitting the vehicle to be brought to a safe halt without throwing the anti-skid element. Loop 127 of toe member 115 is of a size slightly smaller than the diameter of the elastic member in its natural position. In the event it is desired to remove an anti-skid element, or a portion thereof in the event the same breaks, the elastic member may be stretched, reducing the diameter thereof, and then drawn through the loop or loops desired.

Power transfer means F preferably includes a wheel dish 130, body locking flange 131 and locking flange rim ring 132.

Wheel dish 130 is somewhat in the shape of a dish, including a main body portion 135 and a rim flange portion 136. Main body portion 135 is provided with a central opening 138 and has a plurality of apertures 139 spaced about opening 138, which apertures 139 receive lugs 37 in attachment of wheel dish 130 to the vehicle by nuts 38, as shown in FIGS. 4, 5 and 6. A plurality of spaced apart openings 140 may be provided through body portion 135 adjacent rim flange 136 for air passage therethrough in cooling of brake drum 35.

Body locking flange 131 preferably comprises a substantially ring-shaped body portion 141 which interfits over and is interconnected about rim flange 136 of wheel dish 130 by spot welding or otherwise. One side of body portion 141, the side thereof which extends toward mounting means C, is provided with a plurality of spaced apart relatively short lugs 142 and a plurality of spaced-apart relatively longer lugs 143.

Locking flange rim ring 132 preferably includes a disc-like main body portion 145 having a plurality of notches 146 about the outer periphery thereof, a plurality of notch-like cut-outs 147 on the inner diameter thereof, and is provided with a plurality of apertures 148 extending therethrough. Locking flange rim ring 132 is welded or otherwise secured to body locking flange 131 with the relatively shorter lugs 142 and relatively longer lugs 143 extending through apertures 148. Relatively shorter lugs 142 extend within apertures 148 and provide a positive interconnection for transfer of rotational torque from body locking flange 131 to locking flange rim ring 132. Relatively longer lugs 143 extend through and beyond apertures 148, for cooperation with slots 81 of segment ring 75, forming connector means for selective transfer of rotational torque from body locking flange 131 to segment ring 75, as will be subsequently described. Notches 146 and 147 from guideways for cooperation with support means D and means G, as will be subsequently described, and body portion 145 has an outer guide surface 149 which cooperates with guideways 146 and means D as will be subsequently described.

It will be observed that body locking flange 131 is almost in abutment with the inner diameter of hub 40 and, in some instances, it may be desirable to eliminate wheel dish 130, welding or otherwise securing body locking flange 131 directly to the inner diameter of hub 40.

Means G preferbaly includes an inner disc 150 and an outer disc 151 which are operably disposed to cooperate with each other to provide a restraining means for releasably maintaining support means D in disconnection from cooperation with power transfer means F.

Inner disc 150 preferably includes a disc-like main body portion 155 having an inner diameter flange ring 156 and an offset portion 157 at the periphery thereof. As shown in FIG. 11, spring cups 158 may be mounted in diametrically opposed position on one side of body portion 155 and aligned spring cups 159 mounted on the opposite side of body portion 155. An aperture 160 may be provided axially through each aligned spring cup 158 and 159 and body portion 155 adjacent thereto. Spring cups 158 are of a diameter to interfit within spring cups 62 of carrier flange 46 and each spring cup 158 is provided with an elongated flange portion 161 which extends through slots 62$^b$ of carrier flange 46, as will be subsequently described, being provided with a stop pin 162 at the outermost end thereof. As shown in FIG. 11, body portion 155 is provided with a slot 163 adjacent lowermost spring cup 158. A plurality of elongated slots 164 may be provided through body portion 155, for cooling purposes in the flow of air therethrough, or for interconnection of hydraulic elements, etc., which it may be desired to pass therethrough for use with such as brake drum 35 of vehicle wheel B. A stop tab 165 is attached to body portion 155 and extends outwardly from the periphery thereof.

Outer disc 151 preferably includes a disc-like main body portion 170 having an inner diameter flange ring 171 and an offset portion 172 at the periphery thereof. As shown in FIG. 12, spring cups may be mounted in diametrically opposed positions on one side of body portion 170, spring cups 173 being of a diameter to interfit within spring cups 159 of inner disc 150. An aperture 174 may be provided axially through each spring cup 173. As also shown in FIG. 12, body portion 170 is provided with a slot 176 adjacent lowermost spring cup, and a wear plate 177 is mounted on body portion 170 in association with slot 176. Cam lug 178 is attached to body portion 170, extending from one side thereof to the other through notch 179, outwardly from the periphery thereof. A plurality of spaced apart tabs 180 may be attached to body portion 170, such as between stamped-out flanges 181 of body portion 170. Tabs 180 extend outwardly from the periphery of body portion 170. A plurality of elongated slots 182 may be provided through body portion 170 for cooling purposes in the flow of air therethrough, or for interconnection of hydraulic elements, etc., which it may be desired to pass therethrough for use with such as brake drum 35 of vehicle wheel B.

The uppermost segment of body portion 170 may be provided with a flange 185 extending adjacent the uppermost periphery thereof, as viewed in FIG. 12. A stop 186 may be provided on the opposite side of body portion 170 from cam lug 178.

Mounting means C, support means D, power transfer means F and means G are positioned with respect to each other as shown in the drawings, inner disc 150 and outer disc 151 being non-rotatably supported upon carrier flange 46 which is, in turn, non-rotatably attached to axle bracket 45; wheel dish 130, body locking flange 131 and locking flange rim ring 132 being mounted upon vehicle wheel B for rotation therewith; and segment ring 75 being releasably clamped between inner disc 150 and outer disc 151, segment ring 75 being held in a non-rotatable position when clamped between inner disc 150 and outer disc 151 and rotating with vehicle wheel B when released from the clamped position.

Actuating means H preferably includes first spring members 190 which are mounted within interfitting spring cups 62 of carrier flange 46 and spring cups 158 of inner disc 150, for urging of inner disc 150 away from carrier flange 46; second spring members 192 which are mounted within interfitting spring cups 159 of inner disc 150 and spring cups 173 of outer disc 151, for urging outer disc 151 away from inner disc 150; guide pin members 193 which may be attached within the vertically disposed spring cups 159 of inner disc 150 extending through aperture 160 of inner disc 150, through aperture 62ª of carrier flange 46, and attached in juxtaposed relation by means of nuts 196; and second guide pin means 198 which may be attached at one end thereof to outer disc 150, extending through aperture 174 of outer disc 150, aperture 160 of inner disc 150, and aperture 62ª of carrier flange 46, being provided with nuts 199 for maintaining the same in juxtaposed position, and having an outermost end 200 which may be provided with a pin receiving aperture 201 for attachment to control means I.

Spring members 190 and 192 are preferably positioned within the respective spring cups supporting the same for providing a balanced force and urging inner disc 150 away from carrier flange 46 and outer disc 151 away from inner disc 150. Of course, in the relation shown, when inner disc 150 is urged away from carrier flange 46, it will carry with it outer disc 151 so that, in effect, spring member 190 operates to urge both inner disc 150 and outer disc 151 away from carrier flange 46. In this balanced relationship, we have only found it necessary to provide two guide pins 198 which may be attached to control means I in a manner for release of the same so that spring members 190 and 192 may be effective in urging inner disc 150 away from carrier flange 46 and outer disc 151 away from inner disc 150; and for pulling outer disc 150 toward disc 151 and both inner disc 150 and outer disc 151 toward carrier flange 46 for clamping of segment ring 75 therebetween. It is, of course, obvious that the number of actuating means H which are provided is not critical, it only being necessary to provide a sufficient number for balanced exertion of forces in operation of the traction device, and neither is the number of guide pins 198 which may be attached to control means I critical, it only being necessary to provide a sufficient number of them to provide a balanced force relation.

As shown in the drawings, control means I preferably includes a plurality of cables 205 which may be mounted on axle housing 31 such as by brackets 206. Each cable 205 is of the type housing a movable flexible rod 205ª which is attached at one end thereof to the outer end 200 of a guide pin 198 in such a position for reciprocable movement of the same, the other end of each cable 205 being attached to a cable mount 207.

Cable mount 207 may include a mounting bracket or plate 208 which may be supported upon an extension of axle housing 31 or some other part of vehicle assembly A in which the same would be maintained in a substantially constant position with respect to the other mountings on the axle housing, cables 205 being attached to plate 208 such as by attaching rings 210, flexible rods 205ª of each cable 205 extending through mounting plate 208, and being attached to plates 208ª by washers 211 and nuts 212, spring members 213 providing a continuous pull on flexible rods 205ª in disengagement of the traction device, as will be subsequently described. Spring members 213 are, of course, much stronger than springs 190 and 192 and will easily overcome the pull of springs 190 and 192.

Plates 208ª are interconnected to a plate 216 by means of elongated rods 217, plate 216 being attached to the reciprocable shaft 218 of a linear actuator 220.

Linear actuator 220 may be of any conventional type. As shown in FIG. 17, the same includes a casing 221 which houses a reversible electric motor 222 having a drive shaft 223 provided with a head 224 which threadedly engages a movable sleeve member 225. Shaft 218 is attached to threaded sleeve 225. Wires 226 may lead from linear actuator 220 to a control box or switch (not shown) which may be located adjacent the driver's seat, for actuation of linear actuator 220. Upon operating the control switch in one position, electric motor 222 may be operated in a direction (as shown in dot and dash lines in FIG. 17) which pulls threaded sleeve 225 towards electric motor 222, which will pull plate 208ª away from plate 208, exerting a pulling force on rods 205ª which will serve to pull guide pins 198 so that the traction device is urged to a disengaged position, as shown in FIG. 5, and, upon operation of the control switch in the opposite position, will reverse the direction of rotation of electric motor 222, which will move threaded sleeve 225 away from electric motor 222, moving plate 208ª towards plate 208 and relaxing the pull on cable 205ª, which permits spring members 190 and 192 to operate in actuation of the traction device to an engaged position.

In the disengaged position, segments 76 will be held in a collected position against the uppermost portion of segment ring 75 in a securely clamped non-rotatable position between inner disc 150 and outer disc 151. Cam lug 178 of outer disc 151 will be in abutment with latching segment 93, preventing rotation of segment means 76 about segment ring 75 in one direction; stop 186 of outer disc 151 will be in abutment with solid segment 95, preventing rotation of segments 76 about segment ring 75 in the other direction; peripheral flange portion 185 of outer disc 151 will be in engagement with one end of a side portion 84 of a segment 76, as shown in FIG. 4, preventing movement upwardly of the segments 76 and segment ring 75; and the lowermost portion of segments 76 will be clamped between inner disc 150 and outer disc 151, preventing downward movement of segments 76 and segment ring 75. Segments 76 are thus immobilized in a collected position adjacent the uppermost portion of segment ring 75, and the entire assembly is held in a non-rotatable position between inner disc 150 and outer disc 151. This is the position as shown in FIGS. 2, 3, 4 and 5.

When the traction device is in this position, abutment of inner disc inner diameter flange ring 156 with outer disc inner diameter flange ring 171 prevents collection of any debris, etc. therebetween which might render the traction device inoperable.

In application of the traction device about the vehicle wheel, the control box or switch (not shown) is moved by the driver to a position for engagement of the traction device about the vehicle wheel, causing electric current to flow through wires 226 and rotating electric motor 222 in a direction for movement of sleeve 225 to the position as shown in solid lines in FIG. 17. This will cause plate 208ª to assume the position as shown in FIG. 2, relaxing springs 213, which releases the pull upon rods 205ª and permits actuation of the traction device through spring members 190 and 192. The vehicle is then moved slowly in a forward direction, causing a direction of rotation of right-hand vehicle wheel B as indicated in FIG. 3. From this point on, a number of things occur in rapid succession and almost simultaneously, substantially as follows:

Spring member 190 urges inner disc 150, segment ring 75 and outer disc 151 away from carrier flange 46 and spring members 192 urge outer disc 151 away from segment ring 75 and inner disc 150. Guideways 146 are spaced about the outer periphery of locking flange rim ring 132 to receive guide projections 92 of segments 76 when the same are aligned therewith in the collected position. It will be noted that there are a greater number of guideways 146 provided then there will be segments 76. There are preferably twice as many guideways 146 provided as there are projections 92, so that guide projections 92 may mate within aligned guideways 146 in only one-half a rotation of vehicle wheel B. Tabs 180 of outer disc 151 also form guide projections which are calibrated to interfit through guideways 147 of locking flange rim ring 132. Guideways 146 and 147, guide projections 92 of segments 76 and tabs 180 of outer disc 151 are also inter-calibrated to comprise an index means whereby, upon rotation of vehicle wheel B and locking flange rim ring 132 therewith to a predetermined position, tabs 180 of outer disc 151 will fall through guideways 147 at the same instant as guide projections 92 of segments 76 are aligned with and fall into guideways 146.

When the index means as previously described as aligned, tabs 180 of outer disc 151 will fall through guideways 147 and outer disc 151 will be urged by spring members 192 out of any further contact with segment ring 75 and segments 76.

At this particular time, segment ring 75 and inner disc 150 will also be urged by spring members 190 toward locking flange rim ring 132. The index means having previously aligned locking flange rim ring 132 with outer disc 151, segment ring 75 and segment 76, has also aligned relatively longer projections 143 of body locking flange 131 with elongated slots 81 of segment ring 75, relatively longer flanges 143 interfitting within elongated slots 81 for rotation of segment ring 75 with the rotation of vehicle wheel B.

Although guide projections 92 of segments 76 have been spring urged to within guideways 146 of locking flange rim ring 132, the same do not fall completely past locking flange rim ring 132 through guideways 146. Upon further rotation of locking flange rim ring 132, guide projections 92 ride up upon outer guide face 149 of locking flange rim ring 132 and pull segments 76 and segment ring 75 away from inner disc 150. At the time when this pulling of the segments 76 and segment ring 75 away from inner disc 150 occurs, inner disc 150 will have reached its limit of movement under urging of spring members 190. This occurs when pins 162 of spring cups 158 abut against carrier flange 46. This pulling of segments 76 and segment ring 75 toward locking flange rim ring 132 also seats relatively longer flanges 143 firmly within elongated slots 81 of segment ring 75 for rotation of segment ring 75 with rotation of the wheel.

At this particular point, segment ring 75 and segments 76 have been pulled away from contact with inner disc 150 and outer disc 151 has been spring urged out of contact therewith, and segment ring 75 is rotating in accordance with rotation of the vehicle wheel.

At this point, however, stop tab 165 of inner disc 150 is still in abutment with raised projection 109 of latching means 105. Tab 165 being non-rotating, and segments 76 being rotated with the wheel, through interconnection of solid segment 95 with segment ring 75, the abutment of tab 165 with projection 109 holds latching segment 93 in a fixed position. The rotation of solid segment 95 with respect to latching segment 93 serves to draw segments 76 to a spaced apart position about segment ring 75, spacing anti-skid means E about the vehicle wheel. Continued rotation of segment ring 75 will bring depending lug 108 of locking means 105 to a position where it aligns with elongated slot 80 of segment ring 75. When this occurs, segments 76 will have all been spaced about vehicle wheel B, substantially as shown in FIG. 7, and depending lug 108 falls to within slot 80, which drops projection 109 to closely adjacent segment ring 75, as shown in FIG. 9, terminating contact of tab 165 of inner disc 150 with projection 109. At this point, segment ring 75 and segments 76 are free to rotate with respect to inner disc 150 and outer disc 151, and the segments are appropriately spaced about segment ring 75.

As shown in FIG. 4, latch spring 65 extends, in the disengaged position of the traction device, through apertures 163 and 176 of inner disc 150 and outer disc 151. As shown in FIG. 6, spring urging of inner disc 150 away from carrier flange 46 and urging of outer disc 151 away from inner disc 150, causes leaf spring member 66 to be withdrawn from aperture 176 of outer disc 151 and through aperture 163 of inner disc 150 until stop 68 abuts against the inner surface of inner disc 150. When solid segment 95 moves about vehicle wheel B in engagement of the traction device, and when anti-skid elements 110 pass beneath vehicle wheel B, an unusual amount of inward force will be applied to strap 113, which will tend to urge the lower portion of the assembly, namely segment ring 75 and inner disc 150 away from outer disc 151. Stop 68 prevents this movement and maintains the parts in an operative position.

In disengagement of the traction device from the vehicle wheel, the control switch (not shown) is operated to cause current to flow through wires 226 to operate electric motor 222 in a direction to draw sleeve 225 to the position as shown in dot and dash lines in FIG. 17, compacting springs 213, which will exert a force for retraction of rods 205ª of cables 205 and exert a pulling force on guide pins 198, drawing disc 151 toward segment ring 75 and segments 76. The vehicle is put into reverse, and is slowly backed up. The initial application of pull through guide pins 198 will be to draw tabs 180 of outer disc 151 into abutment with outer guide face 149 of locking flange rim ring 132. However, at this time, since guide projections 92 of segments 76 will still be in abutment against outer guide surface 149 of locking flange rim ring 132, further movement of an inward direction is prohibited.

Upon continued rotation of segment ring 75 and segments 76, which are rotating with respect to inner disc 150 and outer disc 151, depending lug 108 of latching means 105 moves into a position of abutment with cam lug 178 of outer disc 151. Upon abutment, depending lug 108 is urged inwardly, through slot 80, riding into engagement with the inner face of segment ring 75, as shown in FIG. 10. Cam lug 178 then rides along the outer face of segment ring 75 a very short distance until it abuts latching segment 93. When cam lug 178 abuts latching segment 93, latching segment 93 is held in a fixed position, segment ring 75 and the other segments 76 rotating with respect thereto, enabling collection of segments 76 adjacent the uppermost portion of vehicle wheel B, as shown in FIG. 3.

When segments 76 are collected about the upper portion of segment ring 75, guide projections 92 thereof falling into alignment with guideways 146 of locking flange rim ring 132, and tabs 180 of outer disc 151 being calibrated with respect thereto for contemporaneous alignment with guideways 147 of locking flange rim ring 132, outer disc 151 and segment ring 75 will be permitted to fall away from locking flange rim ring 132, into a position of abutment of segment ring 75 and segments 76 with inner disc 150, and segment ring 75 and segments 76 will be clamped in a non-rotative position between inner disc 150 and outer disc 151, as shown in FIGS. 3 and 4.

It is to be noted that outer disc 151 is provided with a wear plate member 177 which is positioned with respect to latch spring 66 so that, upon drawing of outer disc 151 toward inner disc 150, wear plate 177 abuts against turned in portion 67 thereof and lifts leaf spring 66 and stop 68 to remove abutment of stop 68 with the inner side of inner disc 150, so that outer disc 151, inner disc 150, and the segment means clamped therebetween may move toward carrier flange 46. The traction device is now in the disengaged position as previously described.

The traction device for the right-hand vehicle wheel B has been mainly shown and described. Since left-hand vehicle wheel B will have a direction of rotation with respect to the traction device that is opposite that of right-hand vehicle wheel B, several slight modifications must be made in the traction device which is applied to the left-hand vehicle wheel. This comprises mainly a reversal of parts, as follows:

Tab 165 of inner disc 150 is disposed to the opposite side of inner disc 150, opposite the position as shown in the drawings; segment ring 75 is turned over so that split 77, rivet opening 79 and elongated slot 80 are on the opposite side from that shown in the drawings; solid segment 95 and latching segment 93 are mounted in reversed order to cooperate with reversal of segment ring 75; and tab lug 178 of outer disc 151 is disposed to the side thereof opposite the position as shown in the drawings.

In the modified form of latching device as shown in FIGS. 18, 19 and 20, segment ring 75 is modified to provide a segment ring 75' which includes an elongated notch 230 instead of a slot 80; latching segment 93 is modified to provide a latching segment 93' having an elongated slot 234 and receives latching means 231 mounted thereon; and outer disc 151 is provided with a cam lug 232 instead of cam lub 178.

Latching means 231 preferably includes a cover plate 236 which is welded or otherwise attached to latching segment 93', extending over slot 234 of latching segment 93', and having and aperture 237 which extends over one end of slot 234. A movable latch member 238 is slidably mounted within slot 234 of latching means 93' and has an upstanding projection 239 which extends through aperture 237 of cover 236 and above the upper surface thereof. Mounting bracket 240 is attached to cover plate 236 and supports a leaf spring member 241 for urging latch member 238 into continual abutment with the inner periphery of segment ring 75'. Movable latch member 238 has a cam lip 242 which cooperates with cam lug 232 of outer disc 151 as will be subsequently described.

When the traction device is in the disengaged position, latch member 238 will be in abutment with the inner diameter of segment ring 75' and, when the traction device is in the engaged position, interfits within notch 230 of segment ring 75', notch 230 thus providing a keeper means for latching cooperation with latching means 231.

The traction device including this modified form of latching means will operate substantially as previously described. That is, in the disengaged position, segments 76 will be held in a collected position against the uppermost portion of segment ring 75' in a securely clamped non-rotatable position between inner disc 150 and outer disc 151. Cam lug of outer disc 151 will be in abutment with latching segment 93' preventing rotation of segment means 76 about segment ring 75' in one direction; stop 186 of outer disc 151 will be in abutment with solid segment 95, preventing rotation of segments 76 about segment ring 75 in the other direction; peripheral flange portion 185 of outer disc 151 will be in engagement with one end of side portion 84 of a segment 76, preventing movement upwardly of segments 76 and segment ring 75'; and the lowermost portion of segment 76 will be clamped between inner disc 150 and outer disc 151, preventing downward movement of segments 76 and segment ring 75'. Segments 76 will thus be immobilized in a collected position adjacent the uppermost portion of segment ring 75' substantially as previously described.

In movement to the engaged position from a disengaged position, the operation of latch means 231 will be as follows:

Stop tab 165 of inner disc 150 will remain in abutment with projection 239 of latch member 238 when segment ring 75' and segments 76 have been pulled away from contact with inner disc 150 and outer disc 151, segment ring 75' rotating in accordance with rotation of the vehicle wheel, and latch member 238 moving along the inner diameter of segment ring 75'. Tab 165 being non-rotating, and segments 76 being rotated with the wheel through interconnection of solid segment 95 with segment ring 75', the abutment of tab 165 with projection 239 holds latching segment 93' in a fixed position. The rotation of solid segment 95 with respect to latching segment 93' serves to draw segments 76 to a spaced apart position about segment ring 75', spacing anti-skid means E about the vehicle wheel, substantially as previously described in connection with abutment of tab 165 of inner disc 150 with projection 109 of latching means 105.

Continued rotation of segment ring 75' will bring latch member 238 to a position where it is aligned with notch 230 of segment ring 75'. When this occurs, segments 76 will have all been spaced about vehicle wheel B and spring 241 will urge latch member 238 to within slot 230. This moves projection 239 toward the periphery of segment ring 75', terminating contact of tab 165 of inner disc 150 with projection 239. At this point, segment ring 75' and segments 76 are free to rotate with respect to inner disc 150 and outer disc 151, and the segments are appropriately spaced about segment ring 75'.

The operation of modified latching means 231 in disengagement of the traction device from about a vehicle wheel is substantially as described in connection with latching means 105. That is, after the initial application of pull through guide pins 198 to draw outer disc 151 toward segment ring 75', and upon continued rotation of segment ring 75' and segments 76, cam portion 242 of latch member 238 will move into a position of abutment with cam lug 232 of outer disc 151. Upon abutment, cam portion 242 rides within cam 232, as shown in FIG. 19, and latch member 238 is pulled out of notch 230 to ride along the inner diameter of segment ring 75'. Cam lug 232 then rides adjacent the outer face of segment ring 75' a very short distance until it abuts latching segment 93'. When cam lug 232 abuts latching segment 93', latching segment 93 is held in a fixed position, segment ring 75' and the other segments 76 rotating with respect thereto, enabling collection of segments 76 adjacent the uppermost portion of vehicle wheel B.

It will thus be observed that one skilled in the art may easily substitute latching means 231 for latching means 105.

Of course, it is obvious that many modifications may be made without departing from the spirit of the invention or the scope of the claims. For instance:

Segment ring 75, inner disc 150 and outer disc 151 may be provided with any suitable reinforcing ribbing in order to strengthen the same; cleat 160 may be provided with a short length of ground engaging chain, a rubber ground engaging surface, flexible studs, or any other sort of ground engaging surface which will fall within the law of the place where the traction device is to be used; inner diameter flange rings 156 and 170 may be provided to overlap one another rather than meet in end to end abutment in preventing accumulation of debris, etc. between inner disc 150 and outer disc 151; or other suitable actuating means and/or control means, hydraulic or manual for instance, could be substituted for the spring actuating means and electric control means as shown and described.

Various other changes in the shape, size and arrangement of parts may be made to the forms of invention herein shown and described without departing from the spirit of the invention.

We claim:

1. In a traction device for a vehicle wheel, the combination of mounting means; anti-skid means including a plurality of anti-skid elements; support means for said anti-skid elements; power transfer means for selective transfer of rotational torque from the vehicle wheel to said support means, said support means including means for transfer of such rotational torque in rotation of said anti-skid elements at the same speed of rotation as the vehicle wheel; means supported on said mounting means for releasably maintaining said support means in disconnection from cooperation with said power transfer means; index means enabling release of said support means from said restraining means for cooperation with said power transfer means and holding of said support means by said restraining means for terminating cooperation between said power transfer means and said support means at only predetermined rotative positions of said support means; releasable latch means and latch cooperating means for spacing of said anti-skid elements about the vehicle wheel at predetermined rotative positions of said support means so that said anti-skid elements rotate with the vehicle wheel and said support means free from said restraining means in the applied position of said traction device and for collection of said anti-skid elements adjacent the uppermost portion of the vehicle wheel in cooperatively maintained position by said restraining means at predetermined rotative positions of said support means in the disengaged position of said traction device; and actuating means for operation of said traction device.

2. In a traction device for a vehicle wheel, the combination of mounting means; segment means including a segment ring and a plurality of segments mounted on said segment ring, one of said segments comprising a solid segment, another of said segments comprising a latching segment, and the others of said segments being disposed intermediate said solid segment, and said latching segment; means for attaching said solid segment in a fixed position on said segment ring, means for mounting the remainder of said segments on said segment ring for movement about said segment ring with respect to said solid segment; latching means mounted on said latching segment; keeper means provided on said segment ring and latch cooperating means operatively associated with said latching means for cooperation with said latching means in spacing apart and collecting together of said segments about said segment ring in respective applied and disengaged positions of said traction device; anti-skid means including a plurality of anti-skid elements mounted on said segments; power transfer means for selective transfer of rotational torque from the vehicle wheel to said segment means; inner and outer members supported on said mounting means for releasably clamping said segment means therebetween in disconnection from cooperation with said power transfer means; index means enabling release of said segment means from said inner and outer members for cooperation with said drive means and clamping of said segment means by said inner and outer members for terminating cooperation between said power transfer means and said segment means at only predetermined positions of said segment means; and actuating means for operation of said traction device.

3. In a traction device for a vehicle wheel having a hub and a non-rotating supporting frame, the combination of a body locking flange; means for attachment of said body locking flange to the hub for rotation with the vehicle wheel; a locking flange rim ring; means interconnecting said locking flange rim ring and said body locking flange for rotation of said locking flange rim ring with said body locking flange; anti-skid means including a plurality of anti-skid elements; segment means; said segment means including a segment ring and a plurality of segments; means for mounting said segments on said segment ring for selectively spacing the same thereabout and collecting together of the same at a predetermined location on said segment ring; means for attachment of an anti-skid element to a segment; connector means for selective transfer of rotational torque from said body locking flange to said segment ring; an outer disc, said outer disc being positioned intermediate said segment ring and said locking flange rim ring; an inner disc, said inner disc being positioned to the opposite side of said segment ring from said outer disc; mounting means for mounting of said outer disc and inner disc in a non-rotative position on the supporting frame for the vehicle wheel; actuating means for selectively clamping said segment means between said inner and outer disc in a non-rotative position unconnected with said connector means and urging said outer disc apart from said inner disc for release of said segment means to rotate independently thereof and also urging said segment ring into juxtaposition for operative engagement with said connector means; said locking flange rim ring, outer disc and segment means including index means enabling selective clamping of said segment means between said inner and outer discs and release of said segment means from the clamping action of said inner and outer discs at only predetermined rotative positions of said segment means; and means operatively engageable with said means for mounting said segments on said segment ring for selectively spacing said segments about said segment ring with said anti-skid element attached to each spaced about the vehicle wheel and for collection together of said segments at the uppermost portion of said segment ring with said anti-skid element attached to each gathered at the uppermost portion of the vehicle wheel.

4. The combination as specified in claim 3 wherein said body locking flange includes a plurality of lugs and said locking flange rim ring includes a plurality of apertures for receiving said lugs in providing a positive interconnection for transfer of rotational torque from said body locking flange to said locking flange rim ring.

5. The combination as specified in claim 3 wherein said body locking flange includes a plurality of relatively elongated lugs and said segment ring includes a plurality of apertures for receiving said lugs, the same comprising said connector means for selective transfer of rotaitonal torque from said body locking flange to said segment ring.

6. The combination as specified in claim 3 wherein said locking flange rim ring includes a plurality of guideways and said outer disc and segment means includes a plurality of guide projections interfitting through said guideways on alignment therewith, the same comprising said index means.

7. The combination as specified in claim 6 wherein in application of said device, said plurality of guide projections of said outer disc move through said guideways therefor under impetus of said actuating means in freeing said segment means for rotation free of said outer disc, said locking flange rim ring has an outer guide surface to the opposite side thereof from said segment means and said guide projections of said segment means are operably positioned to remain partially within said guideways pending slight rotation of said locking flange rim ring with respect thereto whereupon said guide projections of said segment means ride up on said guide surface of said locking flange rim ring and free said segment means for rotation free of said inner disc.

8. In a traction device for a vehicle wheel having a non-rotating supporting frame, the combination of anti-skid means including a plurality of anti-skid elements; segment means, said segment means including a segment ring and a plurality of segments; power transfer means for selective transfer of rotational torque from the vehicle wheel to said segment ring; means for mounting said segments on said segment ring for selectively spacing the same thereabout and collection together of the same at a predetermined location on said segment ring; an outer disc, said outer disc being positioned intermediate said segment ring and said power transfer means; an inner disc, said inner disc being positioned to the opposite side of said segment ring from said outer disc; mounting means for mounting of said outer disc and inner disc in a non-rotative position on the supporting frame for the vehicle wheel; actuating means for selectively clamping said segment between said inner and outer discs in a non-rotative position unconnected with said power transfer means and urging said outer disc apart from said outer disc apart from said inner disc for release of said segment means to rotate independently thereof and also urging said segment means into juxtaposition for operative engagement with said power transfer means; said power transfer means, outer disc and segment means including index means enabling selective clamping of said segment means between said inner and outer discs and release of said segment means from the clamping action of said inner and outer discs at only predetermined rotative positions of said segment means; and means operatively engagable with said means for mounting said segments on said segment ring for selectively spacing said segments about said segment ring with said anti-skid element attached to each spaced about the vehicle wheel and for collection together of said segments at the uppermost portion of said segment ring with said anti-skid element attached to each gathered at the uppermost portion of the vehicle wheel.

9. The combination as specified in claim 8 wherein said power transfer means includes a wheel dish, means for attachment of said wheel dish to the hub for rotation therewith, a body locking flange, means for attachment of said body locking flange to said wheel dish for rotation therewith, a locking flange rim ring, and means interconnecting said locking flange rim ring and said body locking flange for rotation of said locking flange rim ring with said body locking flange.

10. The combination as specified in claim 9 wherein said wheel dish, body locking flange and locking flange rim ring are attached together as an integral unit.

11. The combination as specified in claim 8 wherein one of said segments comprises a solid segment, another of said segments comprises a latching segment, and the others of said segments being disposed intermediate said solid segment and said latching segment, means for attaching said solid segment in a fixed position on said segment ring, means for mounting the remainder of said segments on said segment ring for movement about said segment ring with respect to said solid segment, link means interconnecting said segments, latching means mounted on said latching segment, keeper means provided on said segment ring for latching cooperation with said latching means, latch engaging means mounted on said inner disc in juxtaposition for engagement with said latching means in the unlatched position of said latching means whereby to hold said latching segment in a predetermined position as said segment ring is rotated, and latch release means mounted on said outer disc for unlatching said latching means, said segments, latch means, keeper means, latch engaging means and latch release means being respectively operatively disposed whereby upon operation of said actuating means and aligning of said index means for application of said traction device from the disengaged position thereof said latch engaging means engages said latch and, upon rotation of the vehicle wheel and said segment ring in a predetermined direction, holds said latching segment stationary with respect to said rotating segment ring until said latching means cooperatively latches within said keeper means, said keeper means being disposed with respect to said solid segment so that such latching occurs when said segments are spaced about said segment ring, and said link means interconnecting said segments for movement of the same about said segment ring with respect to said latching segment on such movement of said solid segment with respect to said latching segment, and likewise being respectively operatively disposed whereby upon operation of said actuating means and aligning of said index means for disengagement of said traction device from the applied position thereof, said latch release means unlatches said latch means from said keeper means and said latch engaging means engages said latching segment and, upon rotation of said wheel in a direction of movement opposite that first described, holds said latching segment with respect to said rotating segment ring, said solid segment rotating with said segment ring and collecting said segments closely adjacent one another between said solid segment and said latching segment, said actuating means being operable to disconnect said segment means from said power transfer means when said segments and said anti-skid elements attached thereto are collected adjacent the uppermost portion of the vehicle wheel.

12. The combination as specified in claim 11 wherein said outer disc includes retaining means for maintaining said solid segment at a predetermined position with respect to said latching segment on clamping of said segment means between said inner and outer discs.

13. The combination as specified in claim 8 wherein said actuating means includes a plurality of spring means for urging said inner disc, segment means and outer disc toward said power transfer means for operation of said index means and said outer disc away from said inner disc for freeing said segment means for rotation with respect thereto, and control means for compressing said spring means and drawing said inner disc, segment means and outer disc away from said power transfer means in deactuation of said index means and said outer disc toward said inner disc for clamping said segment means therebetween.

14. The combination as specified in claim 8, wherein each said anti-skid element includes traction strap means attached at one end thereof to a segment and extending in juxtaposition with respect to the ground engaging portion of said wheel for application as a traction member thereabout, said traction strap means including a heel portion adjacent the innermost side of the wheel and a toe portion extending to the outermost side of the wheel, and said anti-skid means including an elongated elastic member, said toe portion including an elastic member receiving portion, said elongated elastic member and said elastic member receiving portion being juxtaposed to draw said traction strap means to an operative position as a traction member on spacing of said anti-skid elements about the wheel in the applied position of said traction device.

15. The combination as specified in claim 14 wherein said outer disc includes a peripheral flange portion juxtaposed for abutment against said segments in retaining said segments in a collected position at a predetermined location.

16. The combination as specified in claim 8 wherein said mounting means includes releasable stop means for maintaining said inner disc in juxtaposed position with respect to said outer disc and segment means against the reaction force transmitted through said anti-skid elements as they pass between the vehicle wheel and the ground surface, said outer disc including release means for releasing said stop means in operation of said actuating means for clamping said segment means between said outer and inner discs.

17. In a traction device for a vehicle wheel having a hub and a non-rotating supporting frame, the combination of a body locking flange, said body locking flange including a plurality of relatively short lugs and a plurality of relatively longer lugs; means for attachment of said body locking flange to the hub for rotation with the vehicle wheel and with the lugs thereof extending in a direction toward the supporting frame; a locking flange rim ring, said locking flange rim ring including a plurality of outer guideways on the periphery thereof, a plurality of inner guideways on the inner diameter thereof, an outer guide surface to one side thereof, and the main body portion thereof including a plurality of apertures positioned for receiving said relatively shorter lugs of said body locking flange; means interconnecting said locking flange rim ring and said body locking flange with the relatively shorter lugs of said body locking flange extending within said apertures of said locking flange rim ring for rotation of said locking flange rim ring with said body locking flange and transfer of rotational torque from said body locking flange to said locking flange rim ring; anti-skid means including a plurality of anti-skid elements; segment means, said segment means including a segment ring and a plurality of segments; an outer disc, said outer disc being positioned intermediate said segment ring and said locking flange rim ring; an inner disc, and inner disc being positioned to the opposite side of said segment ring from said outer disc; mounting means for mounting of said outer disc and inner disc in a non-rotative position on the supporting frame for the vehicle wheel; actuating means including a plurality of spring means for urging said inner disc, segment means and outer disc toward said body locking flange and locking flange rim ring and said outer disc away from said inner disc for freeing said segment means for rotation with respect thereto, and control means for compressing said spring means and drawing said inner disc, segment means and outer disc away from said body locking flange and locking flange rim ring in deactivation of said traction device and said outer disc toward said inner disc for clamping said segment means therebetween; said segment ring including a plurality of apertures for receiving said relatively elongated lugs of said body locking flange for selective transfer of rotational torque from said body locking flange to said segment ring, said outer disc including a plurality of guide projections for interfitting through said inner guideways of said locking flange rim ring and said segment means including a plurality of guide projections for interfitting through said outer guideways on juxtaposed alignment of said outer disc and said segment ring means with said locking flange rim ring, the coopeartion of said guide projections and inner and outer guideways comprising index means for selective clamping of said segment means between said inner and outer discs and release of said segment means from the clamping action of said inner and outer discs at only predetermined rotative positions of said segment means, said guide projections of said segment means and said outer guide surface of said locking flange rim ring being operably positioned so that said guide projections of said segment means remain partially within said outer guideways on operation of said actuating means during a release alignment of said index means until said locking flange rim ring rotates slightly with respect to said segment means, such slight rotation drawing said guide projections of said segment means through said guideways to ride up on said guide surface of said locking flange rim ring which frees said segment means for rotation free of said inner disc and seats said relatively longer lugs of said body locking flange within said apertures of said segment ring; one of said segments of said segment means comprising a solid segment, another of said segments comprising a latching segment, and the others of said segments being disposed intermediate said solid segment and said latching segment, means for attaching said solid segment in a fixed position on said segment ring, means for mounting the remainder of said segments on said segment ring for movement about said segment ring with respect to said solid segment, link means interconnecting said segments, latching means mounted on said latching segment, keeper means provided on said segment ring for latching cooperation with said latching means, latch engaging means mounted on said inner disc in juxtaposition for engagement with said latching means in the unlatched position of said latching means in one direction of rotation of the vehicle whereby to hold said latching segment in a predetermined position as said segment ring is rotated, and latch release means mounted on said outer disc in juxtaposition for unlatching said latching means and engaging said latching segment in the unlatched position of said latching means in a direction of rotation of the vehicle wheel opposite that first mentioned whereby to hold said latching segment in a predetermined position as said segment ring is rotated, said segments, latch means, keeper means, latch engaging means and latch release means being respectively operatively disposed whereby upon operation of said actuating means and aligning of said index means for application of said traction device from the disengaged position thereof, said latch engaging means engages said latch and, upon rotation of the vehicle wheel and said segment ring in a predetermined direction, holds said latching segment stationary with respect to said rotating segment ring until said latching means cooperatively latches within said keeper means, said keeper means being disposed with respect to said solid segments so that such latching occurs when said segments are spaced about said segment ring, and said link means interconnecting said segments for movement of the same about said segment ring with respect to said latching segment on such movement of said solid segment with respect to said latching segment, and said latch release means being respectively operatively disposed whereby upon operation of said actuating means and aligning of said index means for disengagement of said traction device from the applied position thereof said latch release means unlatches said latch means from said keeper means and engages said latching segment and, upon rotation of said wheel in the direction of movement opposite that first described, holds said latching segment with respect to said rotating segment ring, said solid segment rotating with said segment ring and collecting said segments closely adjacent one another between said solid segment and said latching segment, said actuating means being operable to disconnect said segment ring from cooperation with said body locking flange when said segments and said anti-skid elements attached thereto are collected adjacent the uppermost portion of the vehicle wheel, and said anti-skid elements each being operably interconnected with said segments for disposition as an operable traction medium in a spaced apart position about the vehicle wheel on spacing of said segments about said segment ring and are collected together out of ground engaging position, adjacent the uppermost portion of the vehicle wheel on collection of said segments closely adjacent one another on said segment ring.

18. The combination as specified in claim 17 wherein the non-rotating supporting frame of the vehicle wheel comprises an axle housing, said mounting means including an axle bracket and a carrier flange, means for connecting said axle bracket to said frame, means for interconnecting said carrier flange to said axle bracket, said carrier flange, inner disc and outer disc including a plurality of spring cups for housing said spring means, said spring means including spring members positioned within said spring cups of said carrier flange and said inner disc for urging said inner disc away from said carrier flange, spring members positioned within said spring cups of said outer disc and other spring cups of said inner disc than those which receive the first mentioned spring members for urging said outer disc away from said inner disc, pin means operably connected with said outer disc for moving said outer disc toward said inner disc against the urging of said second mentioned spring members and urging said inner disc toward said carrier flange against the urging of said first mentioned spring members, and controls means for regulating movement of said pin means.

19. The combination as specified in claim 18 wherein said control means comprises an interconnected operable assembly for movement of said pin means from a remote position such as the driver's seat of the vehicle having a vehicle wheel including said traction device.

References Cited

UNITED STATES PATENTS 2,126,961   8/1938   Hodgkinson.
2,532,309   12/1950  Hoffman et al.
2,427,510   9/1947   Richardson et al.

ARTHUR L. LA POINT, Primary Examiner